(12) United States Patent
Duan

(10) Patent No.: US 12,168,558 B2
(45) Date of Patent: Dec. 17, 2024

(54) CABLE TIE WITH TWO TOOTH SHAPED SIDES HAVING ENHANCED TENSION

(71) Applicant: Lilong Duan, Hubei (CN)

(72) Inventor: Lilong Duan, Hubei (CN)

( * ) Notice: Subject to any disclaimer, the term of this patent is extended or adjusted under 35 U.S.C. 154(b) by 0 days.

(21) Appl. No.: 18/621,359

(22) Filed: Mar. 29, 2024

(65) Prior Publication Data

US 2024/0239576 A1     Jul. 18, 2024

Related U.S. Application Data

(63) Continuation of application No. PCT/CN2023/132174, filed on Nov. 17, 2023.

(30) Foreign Application Priority Data

Nov. 21, 2022   (CN) .......................... 202211455395.5

(51) Int. Cl.
*B65D 63/10* (2006.01)
(52) U.S. Cl.
CPC ............................. *B65D 63/1027* (2013.01)
(58) Field of Classification Search
CPC ............ B65D 63/1027; B65D 63/1063; B65D 63/1072; Y10T 24/1498
See application file for complete search history.

(56) References Cited

U.S. PATENT DOCUMENTS

| | | | | |
|---|---|---|---|---|
| 5,440,786 A * | 8/1995 | Sorensen | ........... | B65D 63/1081 24/17 AP |
| 5,470,520 A * | 11/1995 | Sorensen | ............. | F16L 3/2336 264/334 |
| 5,642,554 A * | 7/1997 | Sorensen | ........... | B65D 63/1072 24/17 AP |
| 5,664,294 A * | 9/1997 | Sorensen | ........... | B65D 63/1081 24/17 AP |
| 5,924,171 A * | 7/1999 | Sorensen | ............... | F16L 3/2336 24/17 AP |
| 9,038,246 B2 * | 5/2015 | Liang | ................. | B65D 63/1072 24/16 PB |

FOREIGN PATENT DOCUMENTS

CN        202594079 U      12/2012
CN        107054872 A       8/2017

OTHER PUBLICATIONS

International search report of PCT/CN2023/132174.

* cited by examiner

*Primary Examiner* — Robert Sandy

(57) ABSTRACT

Disclosed in the present invention is a cable tie with two tooth shaped sides having enhanced tension, including a locking head and a tie body; one end of the tie body is fixedly connected to an outer wall of one end of the locking head close to an insertion opening, tie teeth are provided on and fixed to outer walls of two sides of the tie body, locking teeth are mounted on inner walls of two sides of the locking head, the locking teeth are adapted to the tie teeth, and a protruding head is integrally formed at one end of the tie body away from the locking head. The tie teeth are provided on and fixed to outer walls of two sides of the tie body, and in combination with the locking teeth provided on the inner walls of the two sides of the locking head.

9 Claims, 4 Drawing Sheets

CABLE TIE WITH TWO TOOTH SHAPED SIDES HAVING ENHANCED TENSION

CROSS REFERENCE TO RELATED APPLICATIONS

The present application is a continuation of International (PCT) Patent Application No. PCT/CN2023/132174, filed on Nov. 17, 2023, which claims the priority of the Chinese patent application No. 202211455395.5, filed on Nov. 21, 2022, and the entire contents of which are hereby incorporated by reference in their entireties.

TECHNICAL FIELD

The present invention relates to the technical field of cable ties, and in particular to a cable tie with two tooth shaped sides having enhanced tension.

BACKGROUND

A cable tie, also known as a wire tie, a zip tie and a lock tie, is a type of tie used to tie things together. According to material classification, cable ties can generally be divided into nylon cable ties, stainless steel cable ties, and plastic injection-molded stainless steel cable ties. There are various types of cable ties according to their functions, including ordinary cable ties, retractable cable ties, tag cable ties, fixed-lock cable ties, pin type cable ties, heavy-tension cable ties, and so on. The cable ties are widely used in the bundling of items such as Christmas gift factories, electronics factories, wire processing factories, wire and cable factories, toy factories, festive occasions, commodities, fresh supermarkets, residential daily necessities, electrical appliances, connectors, etc. The cable tie is often provided with a fixedly connected tie body and a locking head. The locking head is provided with an elastic sheet, locking teeth are provided on the elastic sheet, a row of teeth are integrally formed on an outer wall of one side of the tie body, and when in use, the tie body penetrates through the locking head, so that the elastic sheet engages the locking teeth with the teeth under the effect of its own elastic force, thereby achieving the effect of retaining and fixing the tie body. However, currently, such ties have the following disadvantages:

teeth are provided on one side of the tie body, and the other side is generally in a planar state, so that after the cable tie is locked, only the teeth on one side of the tie body are subjected to a force so as to be prevented from loosening, and a single row of teeth are subjected to a relatively large engagement force, easily causing teeth breakage;

teeth are provided on a single side of the tie body, so that the tie body itself has a non-uniform thickness, and the tie body at adjacent teeth is easily broken when bundling; and teeth are provided on one side of the tie body, and the tie body is shaken by an external force, so that when the teeth are away from the locking teeth, a phenomenon of hook-off and slip-off may occur, causing the bundling to be loosened. With regard to the described problems, the inventor proposes a cable tie with two tooth shaped sides having enhanced tension for solving the described problem.

SUMMARY

In view of the current problems of tie body breakage, teeth breakage and binding loosening caused by teeth provided on a single side of a tie body, an object of the present invention is to provide a cable tie with two tooth shaped sides having enhanced tension.

In order to solve the described technical problem, the present invention adopts the following technical solution: a cable tie with two tooth shaped sides having enhanced tension, comprising a locking head and a tie body, wherein an insertion opening and a pull-out opening are respectively formed at two ends of an inner cavity of the locking head, one end of the tie body is fixedly connected to an outer wall of one end of the locking head close to the insertion opening, tie teeth are provided on and fixed to outer walls of the tie body, tooth surfaces at a same cross-section of the tie teeth on the two sides of the tie body are partially covered by each other in a thickness direction of the tie body, locking teeth are mounted on inner walls of two sides of the locking head, the locking teeth are adapted to the tie teeth, and a protruding head is integrally formed at one end of the tie body away from the locking head.

In a preferred embodiment, the outer wall of the locking head is of a square platform structure, a large end of the square platform structure is close to the insertion opening, and a guiding fillet is provided on the inner wall of the locking head at the insertion opening.

In a preferred embodiment, the tie teeth comprise convex teeth, a plurality of convex teeth are integrally formed on an outer wall of one side of the tie body close to the pull-out opening, grooves are provided on an outer wall of the other side of the tie body, a plurality of inner teeth are fixedly mounted on inner walls of the grooves, the convex teeth and the inner teeth are adapted to the locking teeth, a bending groove is formed at one end of each of the grooves close to the locking head, the convex teeth and the inner teeth are of asymmetric structures along two sides of the tie body, and tooth surfaces at a same cross-section of the convex teeth and the inner teeth are partially covered by each other in the thickness direction of the tie body.

In a preferred embodiment, an outer guiding surface having an inclined structure is formed on one side of each of the convex teeth away from the locking head, an outer stopping surface is formed on one side of each of the convex teeth close to the locking head, an outer platform is provided on one side of each of the convex teeth away from the tie body, and an outer flat groove is formed on an outer wall of the tie body between two adjacent convex teeth.

In a preferred embodiment, an inner guiding surface having an inclined structure is formed on one side of each of the inner teeth away from the locking head, an inner stopping surface is formed on one side of each of the inner teeth close to the locking head, an inner platform is provided on one side of each of the inner teeth away from the tie body, and an inner flat groove is formed on an outer wall of the tie body between two adjacent inner teeth.

In a preferred embodiment, the convex teeth and the inner teeth are uniformly distributed along a length direction of the tie body, the length of the outer platform is the same as that of the inner flat groove, the outer platform is directly opposite to the inner flat groove, the outer guiding surface overlaps with a tooth surface at the inner stopping surface and the inner guiding surface on two sides of the inner platform, and the outer flat groove overlaps with a tooth surface of one end of the inner guiding surface close to the inner flat groove.

In a preferred embodiment, the locking tooth comprises a fixed tooth and an elastic block, the fixed tooth is provided on and fixed to an inner wall of one side of the locking head away from the tie body, and the fixed tooth is adapted to the convex teeth in a meshing manner, one end of the elastic block is fixedly connected to an inner wall of one side of the locking head close to the tie body, a plurality of movable teeth are provided on and fixed to one side of the elastic block close to the fixed tooth, and the movable teeth are adapted to the inner teeth in a meshing manner.

In a preferred embodiment, the width of the elastic block is equal to that of the groove, one end of the elastic block close to the insertion opening is fixedly connected to the inner wall of the locking head, and the fixed tooth is close to the inner wall of the locking head at the pull-out opening.

In a preferred embodiment, limiting plates are fixedly mounted on the inner walls of the locking head on two sides of the elastic block, a storage chamber is formed between sides of the two limit plates close to each other, the elastic block is clamped between the storage chamber, and the insertion opening and the pull-out opening are formed between a side wall of the limiting plate and the inner wall of the locking head at the fixed tooth.

In a preferred embodiment, the thickness of the protruding head is less than that of the tie body, one end of the protruding head away from the tie body is of a triangular structure, and a plurality of anti-slip strips are provided on and fixed to an outer wall of the protruding head.

Compared with the prior art, the present invention has the following beneficial effects:

when the tie body penetrates through the locking head, the inner guiding surface guides and pushes the elastic block through the inclined surface, so that the elastic block slides into the storage chamber so as to facilitate the tie body to penetrate through; and after bundling, the elastic block itself pushes the tie body in an elastic force, so that the movable teeth are engaged with the inner teeth, and at the same time, the tie body is pushed by the elastic blocks to be close to the fixed teeth, and the fixed teeth are engaged with the convex teeth so as to achieve the purpose of forcing when meshed on both sides; the two sides are forced to reduce the force applied to a single tooth, thereby preventing the tooth from breaking; and the two sides are engaged to prevent the tooth from loosening when the tie body is pulled, thereby improving the bundling fastness;

the convex teeth and the inner teeth are uniformly distributed along a length direction of the tie body, the length of the outer platform is the same as that of the inner flat groove, the outer platform is directly opposite to the inner flat groove, the outer guiding surface overlaps with the inner stopping surface and the teeth surface at the inner guiding surface on two sides of the inner platform, and the outer flat groove overlaps with a tooth surface of one end of the inner guiding surface close to the inner flat groove, so that the convex teeth and the inner teeth in the length direction of the tie body are vertical and vertical different teeth, which are neither complementary nor symmetric, and the teeth on the two sides of the tie body are partially overlapped, enabling the overall thickness of the tie body to be uniform, and thus enhancing the overall tensile stress strength, preventing the tie body from being broken at the tooth spacing when the tie body is bent in bundling, and improving the durability.

BRIEF DESCRIPTION OF DRAWINGS

The accompanying drawings, which form a part of the present application, are used to provide a further understanding of the present invention. The schematic embodiments of the present invention and the description thereof are used to explain the present invention, and do not form improper limits to the present invention. In the drawings.

Figure 1:
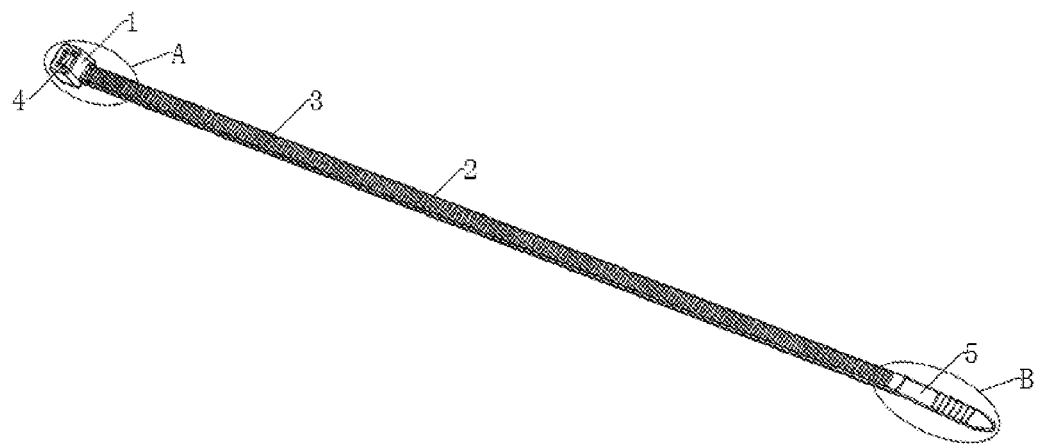
FIG. 1 is a structural diagram of the present invention.

Brief description of the drawings: 1-locking head; 11-pull-out opening; 12-insertion opening; 13-guiding fillet; 2-tie body; 3-tie tooth; 31-convex teeth; 311-outer guiding surface; 312-outer stopping surface; 313-outer platform; 314-outer flat groove; 32-groove; 33-inner teeth; 331-inner guiding surface; 332-inner stopping surface; 333-inner platform; 334-inner flat groove; 34-bending groove; 4-locking tooth; 41-fixed tooth; 42-elastic block; 43-movable tooth; 44-limiting plate; 45-storage chamber; 5-protruding head; and 51-anti-slip strip.

DESCRIPTION OF EMBODIMENTS

The present invention will be described below with reference to the drawings and embodiments in detail. The respective examples are provided by way of explanation of the present invention without limiting the present invention. Indeed, it will be apparent to a person skilled in the art that modifications and variations can be made in the present invention without departing from the scope or spirit of the invention. For example, features shown or described as part of one embodiment may be used in another embodiment to produce yet another embodiment. Therefore, it is expected that the present invention includes such modifications and variations within the scope of the accompanying claims and their equivalent.

In the description of the present invention, orientation or position relationships indicated by terms such as "longitudinal", "lateral", "up", "down", "front", "rear", "left", "right", "vertical", "horizontal", "top", and "bottom" are based on orientation or position relationships shown in the accompanying drawings, which are only used to facilitate description of the present invention rather than requiring that the present invention must be constructed and operated in a specific orientation, and therefore cannot be construed as a limitation on the present invention. The terms "connecting", "connected" and "provided" used in the present invention should be understood broadly, for example, may be fixedly connected, and may also be detachably connected; may also be direct connections or indirect connections via intervening components; may also be wired connections or radio connections; and may also be wireless communication signal connections. A person of ordinary skill in the art would have been able to understand the specific meaning of the described terms according to specific situations.

One or more examples of the present invention are illustrated in the accompanying drawings. The detailed description uses numerals and letter markings to refer to features in the drawings. Similar or like reference signs in the drawings and descriptions have been used to refer to similar or like parts of the present invention. As used herein, the terms "first", "second" and "third" and the like are used interchangeably to distinguish one member from another and are not intended to denote the location or importance of individual members.

Figure 2:
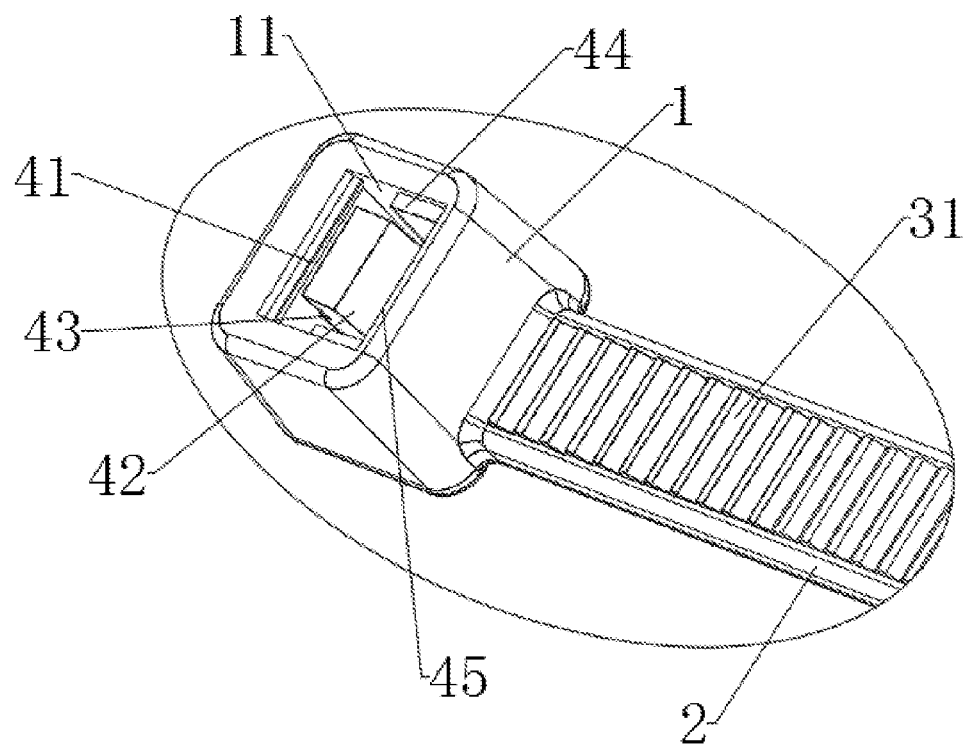
FIG. 2 is an enlarged structural schematic diagram of A in FIG. 1 of the present invention.
Figure 3:
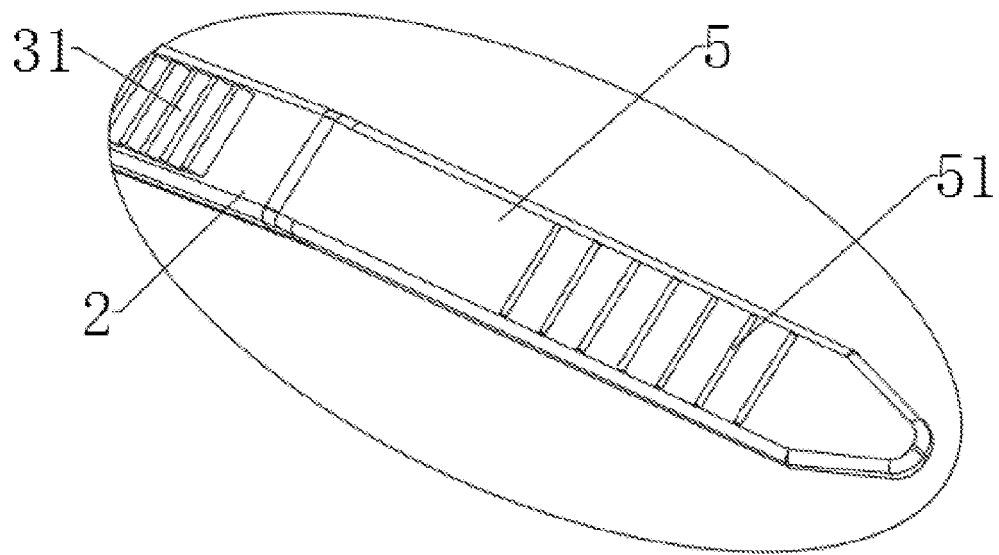
FIG. 3 is an enlarged structural schematic diagram of B in FIG. 1 of the present invention.
Figure 4:
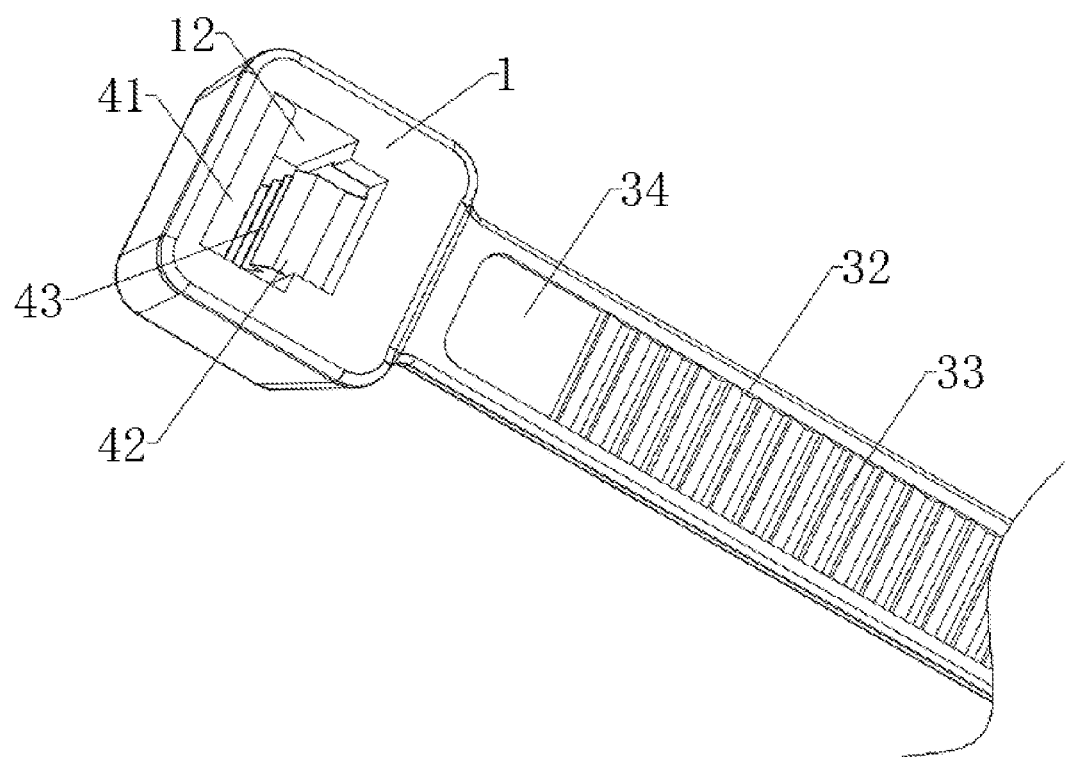
FIG. 4 is a partial structural schematic diagram of a locking head of the present invention.
Figure 5:
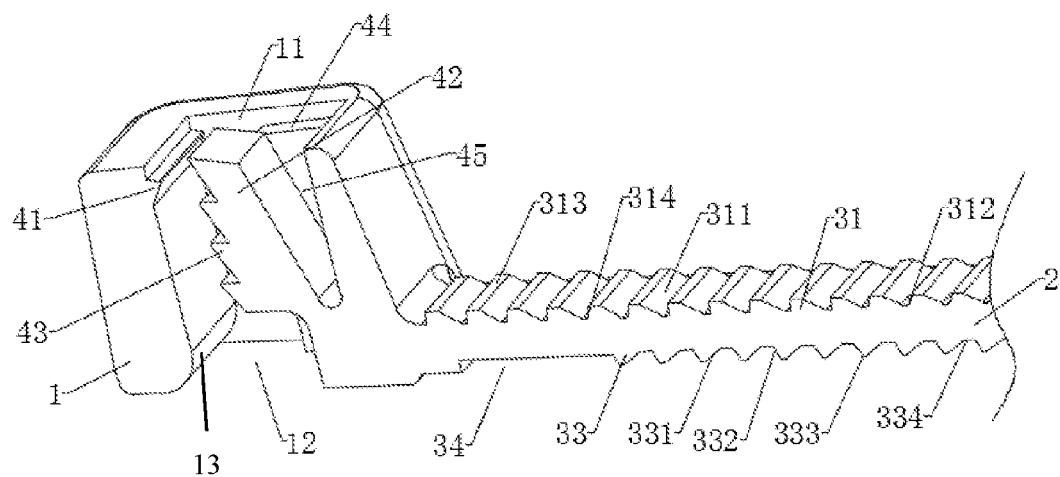
FIG. 5 is a partial cross-sectional structural diagram of the present invention.
Figure 6:
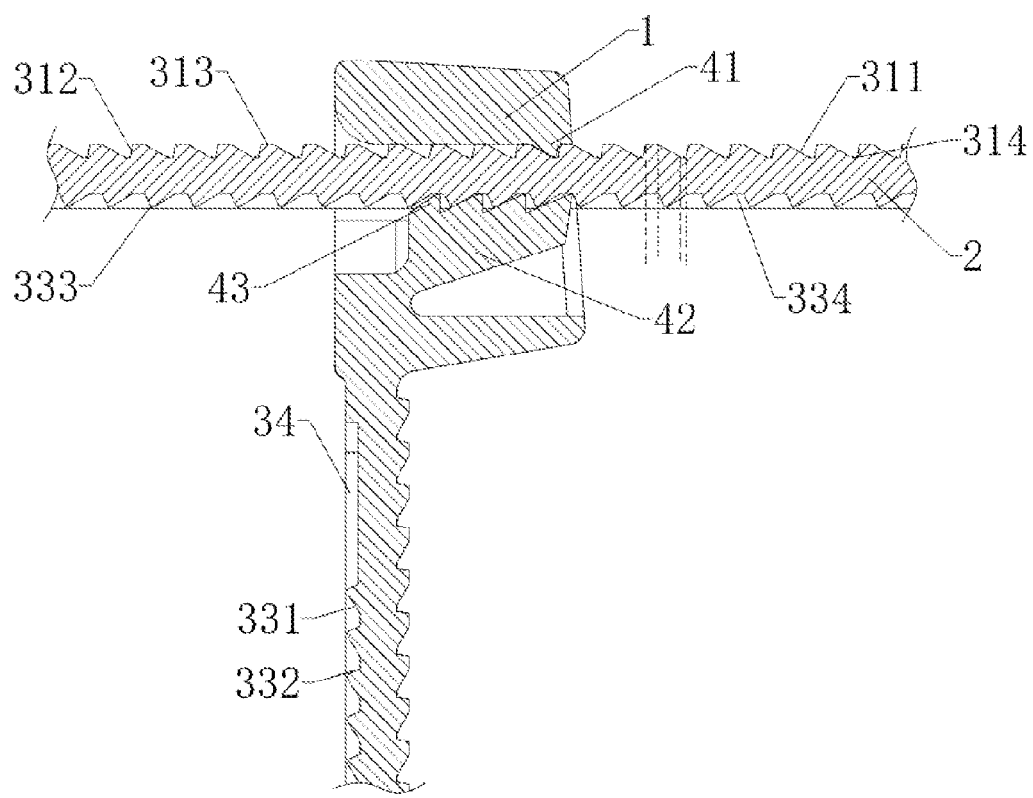
FIG. 6 is a partial cross-sectional diagram showing the structure of the locking head during binding according to the present invention.
Figure 7:
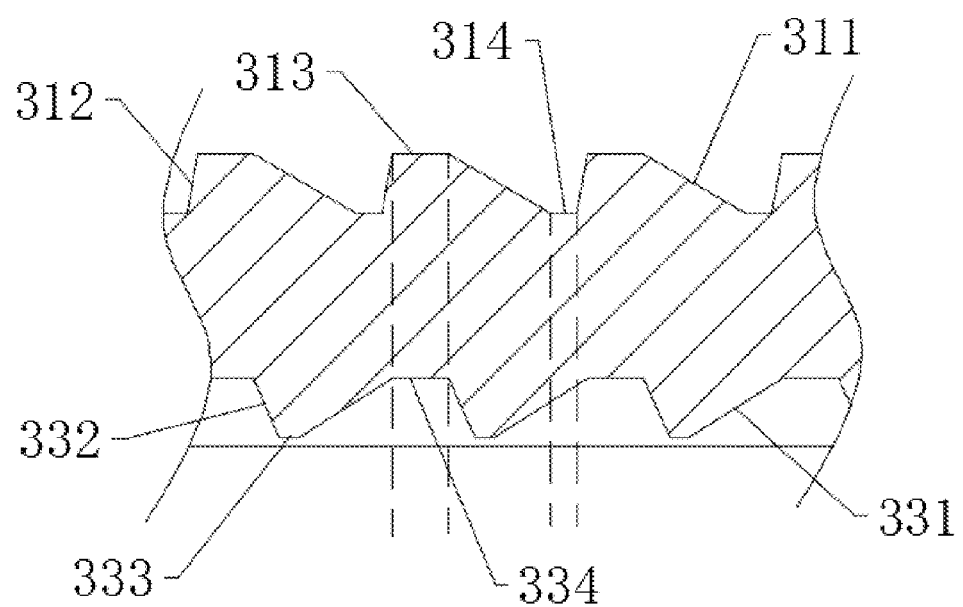
FIG. 7 is a partial cross-sectional diagram showing the convex tooth and the internal tooth according to the present invention.

Embodiments: As shown in FIGS. 1-7, the present invention provides a cable tie with two tooth shaped sides having enhanced tension, comprising a locking head 1 and a tie body 2, wherein an insertion opening 12 and a pull-out opening 11 are respectively formed at two ends of an inner cavity of the locking head 1, one end of the tie body 2 is fixedly connected to an outer wall of one end of the locking head 1 close to the insertion opening 12, tie teeth 3 are provided on and fixed to outer walls of two sides of the tie body 2, tooth surfaces at a same cross-section of the tie teeth 3 on the two sides of the tie body 2 are partially covered by each other in a thickness direction of the tie body 2, locking teeth 4 are mounted on inner walls of two sides of the locking head 1, the locking teeth 4 are adapted to the tie teeth 3, and a protruding head 5 is integrally formed at one end of the tie body 2 away from the locking head 1.

By means of the above technical solution, the tie teeth 3 are provided on and fixed to outer walls of two sides of the tie body 2, and in combination with the locking teeth 4 provided on the inner walls of the two sides of the locking head 1, so that in bundling, by means of the tie body 2, the protruding head 5 is inserted from the insertion opening 12 and pulled out from the pull-out opening 11, and the tie body 2 penetrates through the locking head 1 to bundle items, the tie teeth 3 on two sides of the tie body 2 are meshed with the locking teeth 4, thereby achieving the purpose of preventing the tie body 2 from retracting; the arrangement of the tie teeth 3 on the two sides enables the overall thickness of the tie body 2 to be uniform, thereby avoiding breakage when the tie body 2 is folded; the two sides are subjected to a force, thereby reducing the concentrated force on a single tooth, thereby avoiding tooth breakage; and the meshing on the two sides avoids the teeth to be reversed when the tie body 2 is pulled, thereby improving the bundling fastness.

Further, the outer wall of the locking head 1 is of a square platform structure, a large end of the square platform structure is close to the insertion opening 12, and a guiding fillet 13 is provided on the inner wall of the locking head 1 at the insertion opening 12.

By means of the described technical solution, the square platform structure facilitates the tie body 2 to penetrate through the locking head 1, and the fillet provided at the insertion opening 12 facilitates the tie body 2 to insert, and avoids wearing the tie teeth 3.

Further, the tie teeth 3 comprise convex teeth 31, a plurality of convex teeth 31 are integrally formed on an outer wall of one side of the tie body 2 close to the pull-out opening 11, grooves 32 are provided on an outer wall of the other side of the tie body 2, a plurality of inner teeth 33 are fixedly mounted on inner walls of the grooves 32, the convex teeth 31 and the inner teeth 33 are adapted to the locking teeth 4, a bending groove 34 is formed at one end of each of the grooves 32 close to the locking head 1, the convex teeth 31 and the inner teeth 33 are of asymmetric structures along two sides of the tie body 2, and tooth surfaces of the convex teeth 31 and the inner teeth 33 at the same cross-section partially overlap in the thickness direction of the tie body 2.

By means of the described technical solution, the tensile strength of the tie teeth 3 is improved by means of meshing on two sides of the convex teeth 31 and the inner teeth 33, and the inner teeth 33 are not provided at the bending groove 34, so that the tie body 2 is bent inwards through the bending groove 34, thereby penetrating the locking head 1.

Further, an outer guiding surface 311 having an inclined structure is formed on one side of each of the convex teeth 31 away from the locking head 1, an outer stopping surface 312 is formed on one side of each of the convex teeth 31 close to the locking head 1, an outer platform 313 is provided on one side of each of the convex teeth 31 away from the tie body 2, and an outer flat groove 314 is formed on an outer wall of the tie body 2 between two adjacent convex teeth 31; an inner guiding surface 331 having an inclined structure is formed on one side of each of the inner teeth 33 away from the locking head 1, an inner stopping surface 332 is formed on one side of each of the inner teeth 33 close to the locking head 1, an inner platform 333 is provided on one side of each of the inner teeth 33 away from the tie body 2, and an inner flat groove 334 is formed on an outer wall of the tie body 2 between two adjacent inner teeth 33; the convex teeth 31 and the inner teeth 33 are uniformly distributed along a length direction of the tie body 2, the length of the outer platform 313 is the same as that of the inner flat groove 334, the outer platform 313 is directly opposite to the inner flat groove 334, the outer guiding surface 311 overlaps with a tooth surface at the inner stopping surface 332 and the inner guiding surface 331 on two sides of the inner platform 333, and the outer flat groove 314 overlaps with a tooth surface of one end of the inner guiding surface 331 close to the inner flat groove 334.

By means of the described technical solution, when the tie body 2 penetrates through the locking head 1, the tie body is in contact with the locking teeth 4 through the outer guiding surface 311 and the inner guiding surface 331, so that the tie body penetrates through the locking head 1 by means of inclined guidance; after the bundling is finished, the locking teeth 4 are meshed at the outer flat groove 314 and the inner flat groove 334, and at this time, the outer stopping surface 312 and the inner stopping surface 332 are in contact with the locking teeth 4 for limiting, thereby achieving the purpose of stopping. By means of the forces acting on tie teeth on two sides of the tie body 2, the tensile strength is improved, the force acting on a single tooth is reduced, and breaking of the tie teeth 3 is avoided. The convex teeth 31 and the inner teeth 33 are uniformly distributed along a length direction of the tie body 2, the length of the outer platform 313 is the same as that of the inner flat groove 334, the outer platform 313 is directly opposite to the inner flat groove 334, the outer guiding surface 311 overlaps with a tooth surface at the inner stopping surface 332 and the inner guiding surface 331 on two sides of the inner platform 333, and the outer flat groove 314 overlaps with a tooth surface of one end of the inner guiding surface 331 close to the inner flat groove 334, so that the convex teeth 31 and the inner teeth 33 in the length direction of the tie body 2 are vertical and vertical different teeth, which are neither complementary nor symmetric, and the teeth on the two sides of the tie body 2 are partially overlapped, enabling the overall thickness of the tie body 2 to be uniform, and thus enhancing the overall tensile stress strength, preventing the tie body 2 from being broken at the tooth spacing when the tie body is bent in bundling, and improving the durability.

Further, the locking tooth 4 comprises a fixed tooth 41 and an elastic block 42, the fixed tooth 41 is provided on and fixed to an inner wall of one side of the locking head 1 away from the tie body 2, and the fixed tooth 41 is adapted to the convex teeth 31 in a meshing manner, one end of the elastic block 42 is fixedly connected to an inner wall of one side of the locking head 1 close to the tie body 2, a plurality of movable teeth 43 are provided on and fixed to one side of the elastic block 42 close to the fixed tooth 41, and the movable teeth 43 are adapted to the inner teeth 33 in a meshing manner; the width of the elastic block 42 is equal to that of the groove 32, one end of the elastic block 42 close to the insertion opening 12 is fixedly connected to the inner wall of the locking head 1, and the fixed tooth 41 is close to the inner wall of the locking head 1 at the pull-out opening 11; limiting plates 44 are fixedly mounted on inner walls of the locking head 1 on two sides of the elastic block 42, a storage chamber 45 is formed between sides of the two limit plates 44 close to each other, the elastic block 42 is clamped between the storage chamber 45, and the insertion opening 12 and the pull-out opening 11 are formed between a side wall of the limiting plate 44 and the inner wall of the locking head 1 at the fixed tooth 41.

By means of the described technical solution, when the tie body 2 penetrates through the locking head 1, the inner guiding surface 331 guides and pushes the elastic block 42 through the inclined surface, so that the elastic block 42 slides into the storage chamber 45 so as to facilitate the tie body 2 to penetrate through; and after bundling, the elastic block 42 itself pushes the tie body 2 in an elastic force, so that the movable teeth 43 are engaged with the inner teeth 33, and at the same time, the tie body 2 is pushed by the elastic blocks 42 to be close to the fixed teeth 41, and the fixed teeth 41 are engaged with the convex teeth 31 so as to achieve the purpose of forcing when meshed on both sides; the two sides are forced to reduce the force applied to a single tooth, thereby preventing the tooth from breaking; and the two sides are engaged to prevent the tooth from loosening when the tie body 2 is pulled, thereby improving the bundling fastness.

Further, the thickness of the protruding head 5 is less than that of the tie body 2, one end of the protruding head 5 away from the tie body 2 is of a triangular structure, and a plurality of anti-slip strips 51 are provided on and fixed to an outer wall of the protruding head 5.

By means of the described technical solution, it is convenient for the protruding head 5 having a relatively small thickness to penetrate the locking head 1 first, and then to pull the protruding head 5, so as to pull the tie body 2 out of the locking head 1; and the anti-slip strip 51 increases frictional resistance, thereby being easy to pull.

Working principle: the protruding head 5 having a small thickness is easy to penetrate the locking head 1 first, and then the protruding head 5 is pulled, so as to conveniently pull the tie body 2 out of the locking head 1; when the tie body 2 penetrates through the locking head 1, an outer guiding surface 311 and an inner guiding surface 331 are in contact with the locking teeth 4, and the inner guiding surface 331 guides and pushes the elastic block 42 through an inclined surface, so that the elastic block 42 slides into the storage chamber 45 so as to facilitate the passage of the tie body 2; after bundling, the elastic block 42 itself pushes the tie body 2 in an elastic force, so that the movable teeth 43 is meshed with the inner teeth 33; meanwhile, the tie body 2 is pushed by the elastic block 42 to be close to the fixed teeth 41, and the fixed teeth 41 is meshed with the convex teeth 31, so as to achieve the purpose of forcing when meshed on both sides; the two sides are forced to reduce the force applied to a single tooth, thereby preventing the tooth from breaking; and the two sides are engaged to prevent the tooth from loosening when the tie body 2 is pulled, thereby improving the bundling fastness; and at the same time, the convex teeth 31 and the inner teeth 33 are uniformly distributed along a length direction of the tie body 2, the length of the outer platform 313 is the same as that of the inner flat groove 334, the outer platform 313 is directly opposite to the inner flat groove 334, the outer guiding surface 311 overlaps with a tooth surface at the inner stopping surface 332 and the inner guiding surface 331 on two sides of the inner platform 333, and the outer flat groove 314 overlaps with a tooth surface of one end of the inner guiding surface 331 close to the inner flat groove 334, so that the convex teeth 31 and the inner teeth 33 in the length direction of the tie body 2 are vertical and vertical different teeth, which are neither complementary nor symmetric, and the teeth on the two sides of the tie body 2 are partially overlapped, enabling the overall thickness of the tie body 2 to be uniform, and thus enhancing the overall tensile stress strength, preventing the tie body 2 from being broken at the tooth spacing when the tie body is bent in bundling, and improving the durability.

Obviously, a person skilled in the art can make various modifications and variations to the present invention without departing from the spirit and scope of the present invention. As such, if these modifications and variations of the present invention belong to the scope of the claims of the present invention and their equivalents, the present invention is intended to include these modifications and variations.

The foregoing is merely a preferred embodiment of the present invention and is not intended to limit the present invention which may be subject to various modifications and variations to a person skilled in the art. Any modification, equivalent replacement, improvement, etc. made within the spirit and principles of the present invention should be included in the scope of protection of the present invention.

What is claimed is:

1. A cable tie with two tooth shaped sides having enhanced tension, comprising a locking head and a tie body, wherein an insertion opening and a pull-out opening are respectively formed at two ends of an inner cavity of the locking head, one end of the tie body is fixedly connected to an outer wall of one end of the locking head close to the insertion opening, tie teeth are provided on and fixed to outer walls of two sides of the tie body, tooth surfaces at a same cross-section of the tie teeth on the two sides of the tie body are partially covered by each other in a thickness direction of the tie body, locking teeth are mounted on inner walls of two sides of the locking head, the locking teeth are adapted to the tie teeth, and a protruding head is integrally formed at one end of the tie body away from the locking head;

wherein the tie teeth comprise a plurality of convex teeth, the plurality of convex teeth are integrally formed on an outer wall of one side of the tie body close to the pull-out opening, grooves are provided on an outer wall of an other side of the tie body, a plurality of inner teeth are fixedly mounted on inner walls of the grooves, the plurality of convex teeth and the plurality of inner teeth are adapted to the locking teeth, a bending groove is formed at one end of each of the grooves close to the locking head, the plurality of convex teeth and the plurality of inner teeth are of asymmetric structures along two sides of the tie body, and tooth surfaces at a same cross-section of the plurality of convex teeth and the plurality of inner teeth are partially covered by each other in the thickness direction of the tie body.

2. The cable tie with two tooth shaped sides having enhanced tension according to claim 1, wherein an outer guiding surface having an inclined structure is formed on one side of each of the convex teeth away from the locking head, an outer stopping surface is formed on one side of each of the convex teeth close to the locking head, an outer platform is provided on one side of each of the convex teeth away from the tie body, and an outer flat groove is formed on an outer wall of the tie body between two adjacent convex teeth.

3. The cable tie with two tooth shaped sides having enhanced tension according to claim 2, wherein an inner guiding surface having an inclined structure is formed on one side of each of the inner teeth away from the locking head, an inner stopping surface is formed on one side of each of the inner teeth close to the locking head, an inner platform is provided on one side of each of the inner teeth away from the tie body, and an inner flat groove is formed on an outer wall of the tie body between two adjacent inner teeth.

4. The cable tie with two tooth shaped sides having enhanced tension according to claim 3, wherein the convex teeth and the inner teeth are uniformly distributed along a length direction of the tie body, a length of the outer platform is the same as that of the inner flat groove, the outer platform is directly opposite to the inner flat groove, the outer guiding surface overlaps with a tooth surface at the inner stopping surface and the inner guiding surface on two sides of the inner platform, and the outer flat groove overlaps with a tooth surface of one end of the inner guiding surface close to the inner flat groove.

5. The cable tie with two tooth shaped sides having enhanced tension according to claim 4, wherein the locking teeth comprise a fixed tooth and an elastic block, the fixed tooth is provided on and fixed to an inner wall of one side of the locking head away from the tie body, and the fixed tooth is adapted to the convex teeth in a meshing manner, one end of the elastic block is fixedly connected to an inner wall of one side of the locking head close to the tie body, a plurality of movable teeth are provided on and fixed to one side of the elastic block close to the fixed tooth, and the movable teeth are adapted to the inner teeth in a meshing manner.

6. The cable tie with two tooth shaped sides having enhanced tension according to claim 5, wherein a width of the elastic block is equal to a width of each of the grooves, one end of the elastic block close to the insertion opening is fixedly connected to the inner wall of the locking head, and the fixed tooth is close to the inner wall of the locking head at the pull-out opening.

7. The cable tie with two tooth shaped sides having enhanced tension according to claim 5, wherein limiting plates are fixedly mounted on the inner walls of the locking head on two sides of the elastic block, a storage chamber is formed between sides of the limiting plates close to each other, the elastic block is clamped between the storage chamber, and the insertion opening and the pull-out opening are formed between a side wall of the limiting plates and the inner wall of the locking head at the fixed tooth.

8. The cable tie with two tooth shaped sides having enhanced tension according to claim 1, wherein a thickness of the protruding head is less than that of the tie body, one end of the protruding head away from the tie body is of a triangular structure, and a plurality of anti-slip strips are provided on and fixed to an outer wall of the protruding head.

9. The cable tie with two tooth shaped sides having enhanced tension according to claim 1, wherein the outer wall of the locking head is of a square platform structure, a large end of the square platform structure is close to the insertion opening, and a guiding fillet is provided on the inner wall of the locking head at the insertion opening.

* * * * *